US012658168B2

(12) United States Patent
Tuncdemir et al.

(10) Patent No.: US 12,658,168 B2
(45) Date of Patent: Jun. 16, 2026

(54) CLASS VIII FLEXTENSIONAL TRANSDUCERS AND METHOD OF ASSEMBLY

(71) Applicants: Safakcan Tuncdemir, Linden, PA (US); Joshua Gambal, Linden, PA (US); Gareth Knowles, Linden, PA (US)

(72) Inventors: Safakcan Tuncdemir, Linden, PA (US); Joshua Gambal, Linden, PA (US); Gareth Knowles, Linden, PA (US)

(73) Assignee: QorTek, Inc., Linden, PA (US)

( * ) Notice: Subject to any disclaimer, the term of this patent is extended or adjusted under 35 U.S.C. 154(b) by 424 days.

(21) Appl. No.: 17/911,945

(22) PCT Filed: Mar. 16, 2021

(86) PCT No.: PCT/US2021/022632
§ 371 (c)(1),
(2) Date: Sep. 15, 2022

(87) PCT Pub. No.: WO2021/252041
PCT Pub. Date: Dec. 16, 2021

(65) Prior Publication Data

US 2023/0146098 A1 May 11, 2023

Related U.S. Application Data

(60) Provisional application No. 62/990,377, filed on Mar. 16, 2020.

(51) Int. Cl.

| | |
|---|---|
| ***G10K 9/12*** | (2006.01) |
| ***G10K 9/22*** | (2006.01) |
| ***H04R 1/22*** | (2006.01) |

(52) U.S. Cl.
CPC ............... *G10K 9/121* (2013.01); *G10K 9/22* (2013.01); *H04R 1/22* (2013.01)

(58) Field of Classification Search
CPC ...... G10K 9/121; G10K 9/22; G10K 2200/11; G10K 9/122; H04R 1/22; H04R 1/42;
(Continued)

(56) References Cited

U.S. PATENT DOCUMENTS 3,258,738 A 6/1966 Merchant
4,409,681 A * 10/1983 White ...................... H04R 1/42 367/166

(Continued)

FOREIGN PATENT DOCUMENTS

CN 108769869 A1 11/2018

OTHER PUBLICATIONS

C. Sherman and J. Butler, "Transducers and Arrays for Underwater Sound," Springer-Verlag (2011), 12, 188-189.

(Continued)

*Primary Examiner* — Angelica M McKinney
(74) *Attorney, Agent, or Firm* — Cahn & Samuels, LLP

(57) ABSTRACT

A semi-wave transducer is provided that comprises a circular or elliptic transduction shell that has sidewalls captured between identical opposing upper and lower circular or elliptic conical segments (platens), each having a surface geometry of a radially symmetric wave shape that includes a center region and a rim wherein the distance between the center region of the upper and lower platens greater than the distance between the rims of the upper and lower platens. In some embodiments, the surface geometry of the platens may be a jinc function or a recurve function.

3 Claims, 12 Drawing Sheets

(58) Field of Classification Search
CPC ...... B06B 1/0644; B06B 1/0607; H02N 2/18; H02N 2/043
See application file for complete search history.

(56) References Cited

U.S. PATENT DOCUMENTS

| | | | | |
|---|---|---|---|---|
| 4,845,688 | A * | 7/1989 | Butler | H02N 2/043<br>367/174 |
| 5,469,406 | A | 11/1995 | Scarpitta et al. | |
| 6,465,936 | B1 * | 10/2002 | Knowles | H02N 2/043<br>310/328 |
| 6,614,143 | B2 | 9/2003 | Zhang et al. | |
| 6,643,222 | B2 | 11/2003 | Osborn et al. | |
| 6,798,122 | B1 | 9/2004 | Howarth et al. | |
| 2003/0128628 | A1 * | 7/2003 | Osborn | G10K 9/121<br>367/163 |
| 2007/0090723 | A1 | 4/2007 | Keolian et al. | |
| 2008/0238260 | A1 * | 10/2008 | Xu | H02N 2/18<br>310/339 |
| 2011/0002484 | A1 * | 1/2011 | Hama | B06B 1/0607<br>381/152 |
| 2018/0200758 | A1 * | 7/2018 | Schafer | B06B 1/0644 |

OTHER PUBLICATIONS

R. E. Blahut, "Theory of Remote Image Formation," Cambridge University Press (2004); 82-83.

* cited by examiner

CLASS VIII FLEXTENSIONAL TRANSDUCERS AND METHOD OF ASSEMBLY

This application claims the benefit of U.S. Provisional Patent Application Ser. No. 62/990,377 filed on Mar. 16, 2020, which is incorporated by reference herein in its entirety.

STATEMENT REGARDING FEDERALLY SPONSORED RESEARCH OR DEVELOPMENT

This invention was made with government support under US Government Small Business Technology Transfer (SBIR) Contract: N68335-18-C-0477 awarded by The United States Navy. The government has certain rights in the invention.

FIELD OF THE INVENTION

This invention relates to low frequency transducers that operate at high hydrostatic pressures.

BACKGROUND OF THE INVENTION

Flextensional transducers have been used as underwater transducers since the 1950s and the US Navy presently fields such devices as acoustic countermeasures to deter and counter both enemy sonar systems and torpedoes. Such transducers comprise of a transductive assembly such as those based on piezoelectric or magnetostrictive drive element and a mechanical shell structure that clamps these element(s). The shell acts as a mechanical transformer which transforms the high impedance, small extensional motion of the transductive assembly into low impedance, large flexural motion of the shell. According to the shape of the shell, such transducer assemblies of prior art are divided into seven classes—Class I-Class VII.

In particular, low frequency transducers having resonances below about 1 KHz-10 kHz have numerous applications as low frequency sonar projectors. The acoustic wavelength corresponding to these frequencies is on the order of the size of naval mines, and thus can hunt for and/or classify them, as well as objects of similar size. Also, wavelengths of this size permit sonar location of buried objects, a task of interest to a wide range of commercial and governmental concerns. A large problem is that the designs of these transducer classes do not exhibit stable performance as hydrostatic pressure is applied. Transducers of prior art operate at increasing depths. The increasing hydrostatic pressure causes large variations in critical sonar metrics of Free-Field Voltage Sensitivity (FFVS) and Transmitting Voltage Response (TVR).

A further challenge is that of operating at lower sub kHz frequencies, especially at greater depths. Ability to operate transducers at lower frequencies enables longer range communication. Compact sized underwater transducers are becoming essential to deployed unmanned submersibles. In particular, there is large interest to enhance the range of underwater communication capability to beyond 10 km by employment of a compact, i.e., <4 inches, high-power underwater transducers that can be operated at depths below 400 ft. Of special note is compact communication needs for underwater drones, small UUAVs, and unmanned submarines. Such submersibles are also of interest in detecting objects in littoral environments for which small, unmanned submersible vehicles are best-suited due to volumetric constraints. This leads to a demand for sonar transducers that are compact but able to operate at lower depths, and that can communicate over longer ranges at such depths.

Conventionally, the only means to achieve longer range communication (lower operational frequency) is to increase the overall mass of the transducer employed or design a complex mechanical structure incorporating a plurality of transductive elements. Such existing transducer designs that are capable of generating sufficient acoustic power at frequencies under 30 kHz include free-flooded piezoelectric ceramic rings, electromagnetic and hydraulic drivers, tonpilz or piston transducers, and some flextensional devices. However, increasing size/weight often runs counter to modern advances in underwater system that are generally seeking more compact platforms introducing increasingly limited volumes for transducer or projector install, especially for applications where the transducer forms part of a hull protrusion.

Prior art Class-V transducers, such as those shown in FIG. 1, have proven their capability of providing very high figure of merit of acoustic radiation at low frequencies, attaining high Transmitting Voltage Response (TVR) in compact forms in the range of 55-60 watts/kHz kg as to represent the highest figure of merit across all said seven classes of flextensional transducers used in underwater applications. Importantly, due to their stiffer drive structure as compared to other classes of transducer, Class-V (Cymbal) transducers can withstand greater stress so the present solution is to employ Class-V transducers for acoustic projectors at depth. However, there is a fundamental problem with Class-V transducers in that, at present, these cannot operate at greater depths, e.g., depths of greater than about 200 ft. (61 meters). At such depths static water pressures will cause the top and bottom conical platens to collapse and impinge onto the transversal transductive assembly. For example, a 3-inch diameter Class-V transducer will experience sufficient deformation even at 200 ft (61 meters) in normal salinity and temperature conditions as to cause said top and bottom platens to collapse onto the transductive assembly, making them non-operational as an acoustic projector when approaching pressures at such depths.

Class VI and Class VII flextensional transducers were introduced as a means of overcoming the limitation of transducers at greater depths. Class VII transducers are made from shells shaped like a dog bone and, consequently, are known as dog-bone shell transducers. Both classes essentially invert their outer shells as to present a convex structure as opposed to the convex structure of Class-V transducers. Such classes of transducer advantageously produce circumferential pressure on the outer connector ring with increasing ambient pressure.

Known underwater transducers do not achieve low frequency acoustical behavior when exposed to elevated hydrostatic pressure without addition of significant mass and shell (housing) volume. The optimal configuration for ring transducer designs to resist hydrostatic pressure is to design the shell to an approximate annular (for planar transducers) or spherical (for ring transducers) shape. However, this introduces unacceptable size and weight penalties for use in many smaller deep-water operating submersibles. U.S. Pat. No. 6,643,222 B2 introduces a planar transducer that may be considered equally as a modified Class IV or Class VII transducer where the oval shell has a planar 'concave-convex' geometry as to purportedly provide higher resistance to hydrostatic pressure without resorting to a large spherical geometry. The problem it introduces is its 'continuous wave' profile incorporates heavy convex bulbous ends (element [110] of FIG. 2) to allow a substantially constant stress on said transduction assembly over a broad range of depths. The purpose of which is enable the transducer to operate at shallow depths prior to the increasing circumferential pressure induced stress occurring at depth. Thus, the design described in the '222 patent is neither compact nor lightweight making it unsuitable for incorporation into smaller deep water operating submersibles. Moreover, it is limited in depth of operation (ambient pressure) to whatever the pre-set compression formed on transduction driver 30 by shell 200 during assembly.

U.S. Pat. No. 6,798,122 B1 discloses a projection array comprising transducers of ring-type, in this case Class V, transducers. However, the prior art recognizes challenges in achieving such a projector array of ring-type transducers. Arrays of ring transducers require adding threaded posts (element 10 shown in FIG. 3) welded to the apex (centroid) of the top portion of the top platen of each transducer element as to provide mechanical connection points (elements 16A and 20A shown in FIG. 3) rigidly connecting adjacent transducers; similarly repeated for the bottom platen of each ring transducer shell. These threaded posts now also act as the means for positive and negative polarity connections of the transductive element, typically a piezoceramic disc wherein a washer and nut are used to mechanically affix flexible copper electrical conductor strips.

What is needed is a transducer capable of operating at elevated hydrostatic pressures in a compact lightweight design suitable for small deep water operating submersibles. What is further needed is a transducer array assembly that eliminates the use of individual connectors for each transducer.

III. SUMMARY OF INVENTION DISCLOSED

The invention in at least one embodiment provides a circular flextensional transducer comprising: first and second platens of semi-wave geometry, where each platen has a positive semi-wave angle; and a transductive element secured between the rims of said first and second platens and that is coaxially aligned with said first and second platens.

In another embodiment, an elliptical flextensional transducer is provided that includes a first platen of semi-wave geometry, the first platen has a positive semi-wave angle and a generally flat rim. A first sidewall assembly including a stacked ring and sidewall is stacked with the first platen. A second sidewall assembly including a stacked ring and sidewall is provided. A transductive element is disposed between and captured by the rings of the first and second sidewall and the second sidewall assembly is stacked with the first sidewall assembly. A second platen of semi-wave geometry is provided which has a positive semi-wave angle and a generally flat rim. The second platen is stacked with the second sidewall assembly.

In yet another embodiment, a method for assembling an elliptical transducer is provided. The method includes selecting a first paten of semi-wave geometry and diameter d1 having an upward facing rim and attaching a first annular spacer having an outer diameter of d1 to the upward facing rim. A first capture ring having outer diameter d1 and an inner diameter d2 with its inner diameter indented with a lower indentation of height h/2 is attached to the first annular spacer. A transductive element of diameter d2 and about height h is attached to the first capture ring. The method further includes attaching a second capture ring having outer diameter approximately d1 and an inner diameter d2 with its inner diameter indented with a lower indentation of height h/2 to the first capture ring, attaching a second annular spacer having outer diameter of d1 to the second capture ring, and attaching a second platen of semi-wave geometry and diameter d1 with downward facing rim to the second annular spacer.

In a further embodiment, a method for assembling an elliptical transducer comprises positioning a transduction element between indentations of a first and second capture ring, bonding the first capture ring to the second capture ring, bonding the first capture ring to a first annular spacer, bonding the second capture ring to a second annular spacer, bonding the first annular ring to a first platen, and bonding the second annular ring to a second platen.

In still a further embodiment, a compound acoustic transducer comprises a plurality of adjacent elliptical transducers, where each transducer includes: an upper conical assembly comprising of a first platen of semi-wave geometry, a first annular spacer and a first capture ring. Each transducer further includes a lower conical assembly comprising of a second platen of semi-wave geometry, a second annular spacer and a second capture ring. A transductive element is captured between upper and lower conical assemblies and at least the upper conical assemblies of at least first and second adjacent transducers are rigidly connected to each other.

In yet another embodiment, a platen for an elliptical transducer is provided. The platen has a positive semi-wave angle and a surface geometry of a radially symmetric wave shape including a center region and a rim. The surface includes a plurality of undulations that first form a local minima along a radial path from the rim to the center region. Each of the plurality of undulations includes a local maxima and the local maximas increase along the radial path from the rim to the center region.

VI. BRIEF DESCRIPTION OF THE DRAWINGS

The present invention is described with reference to the accompanying drawings. In the drawings, like reference numbers indicate identical or functionally similar elements. The use of cross-hatching and shading within the drawings is not intended as limiting the type of materials that may be used to manufacture the invention.

VII. DESCRIPTION OF THE EMBODIMENTS

The present invention is generally directed to a semi-wave spherical transducer that comprises a circular or elliptic transduction assembly (shell) that has sidewalls captured between identical opposing circular or elliptic conical segments (platens), each having a surface geometry of a radially symmetric wave shape that includes a center region and a rim wherein the distance between the upper and lower center regions is strictly greater than the distance between the upper and lower rims. Typically, any radial undulation line-cut of the semi-wave platen geometry identically terminates at a small annular region at the rim and a small disc region of radius greater or equal to zero centered at its apex that is generally flat. The undulation path of each radial cut of the platen is of a (wave) geometry introducing local maxima and minima, for the corresponding platen to be considered semi-wave, these isomorphic undulation paths must meet certain geometric requirements: (i) taken from the rim each undulation first forms a local minima (a first inward undulation), (ii) the local maxima of each undulation path are strictly increasing from the rim to apex, (ili) the semi-wave angle, defined as this positive slope of the conical segment as taken between the rim and the central axis in reference to its radial axis, must be strictly positive.

The overall curvature design of the shell is designed in such a manner that it induces a negative Poisson ratio on the overall transducer shell assembly, improves the TVR, and decreases its effective frequency band over all such 2D or 3D shell structures of prior art. In some embodiments, the undulation pattern and flat regions comprising the conical shell surface geometry are developed using 3D modeling algorithms as to ensure negative Poisson's ratio behavior.

Embodiments of a Class-VIII transducer may exhibit by one or more of the following characteristics. First, the transducer may have identical top and bottom platen that are uniformly radial and not planar. Second, the platens may possess a uniform semi-wave geometry, that is, any radial cut from any edge point to the center of a platen forms a semi-wave function independent of selection of edge point. Third, the maximum height of each platen occurs, at or near, its center point is significantly higher than any point on the rim of said platen, i.e., having a strictly positive semi-wave angle. Fourth the undulation geometry of the platens is made to be generally horizontally flat over a small region around its center point and generally is made to be horizontally flat over a small region around its circumference. A transductive element in the form of a disc or disc assembly is captured between the upper and lower platen. The transductive element may include monolithic or multilayer piezoceramic discs, magnetostrictive discs, or combinations thereof where laminates and parts are suitably electroded.

Figure 1:
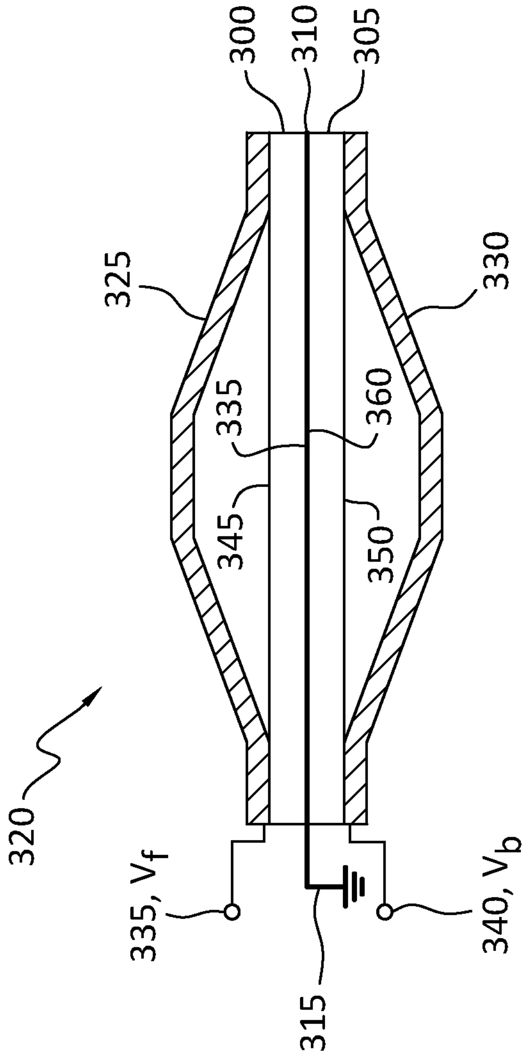
FIG. 1 PRIOR ART
FIG. 1 depicts a prior art Class-V acoustic projector.
Figure 2:
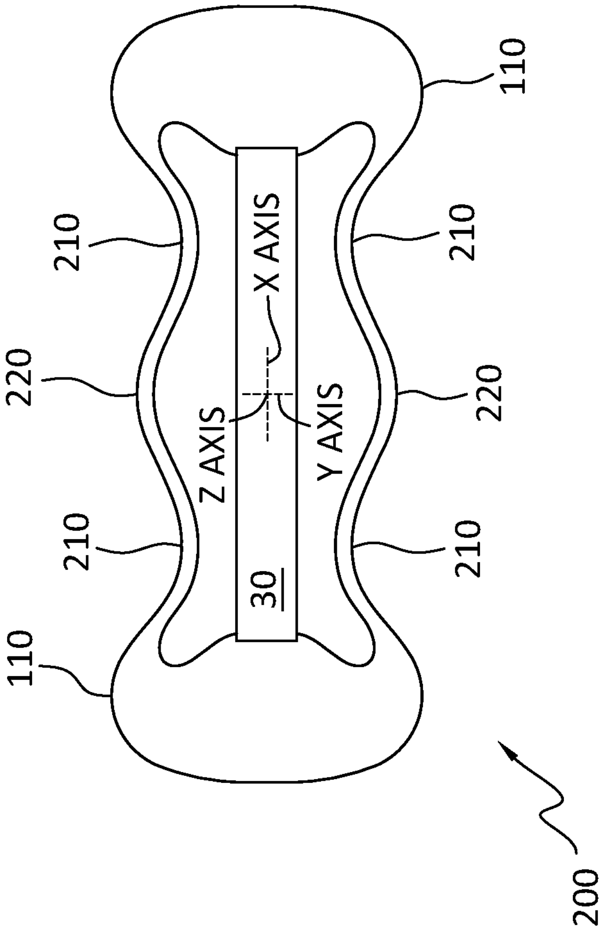
FIG. 2 PRIOR ART
FIG. 2 shows a prior art continuous wave Class-VII acoustic projector having bulbous ends.
Figure 3A:
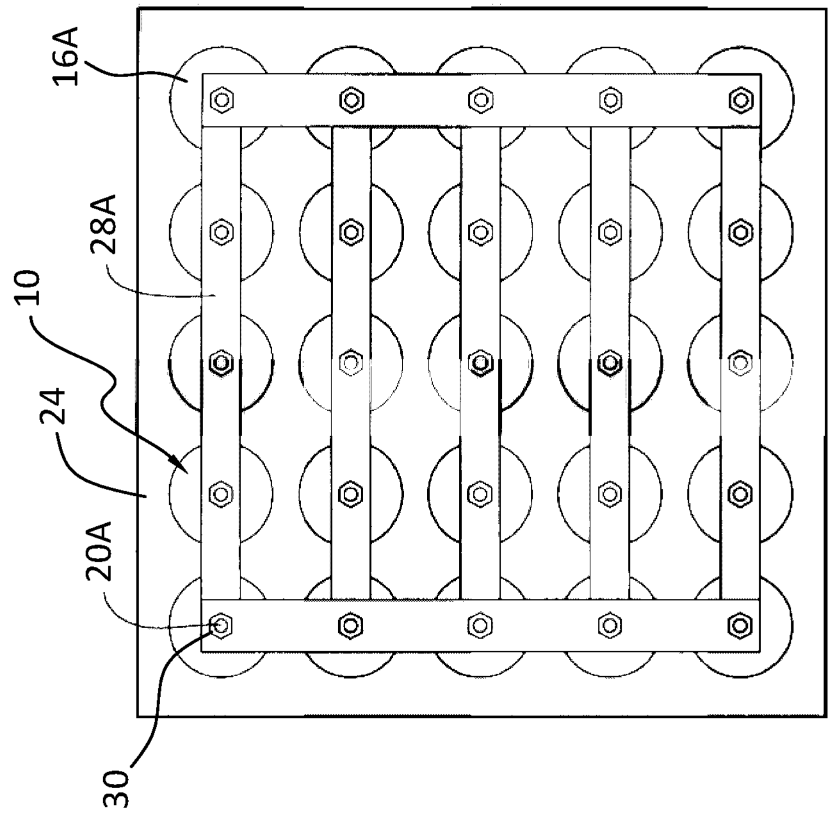
FIG. 3A PRIOR ART
FIG. 3A illustrates a top view of a prior art acoustic projector array comprised of Class-V transducers.
Figure 3B:
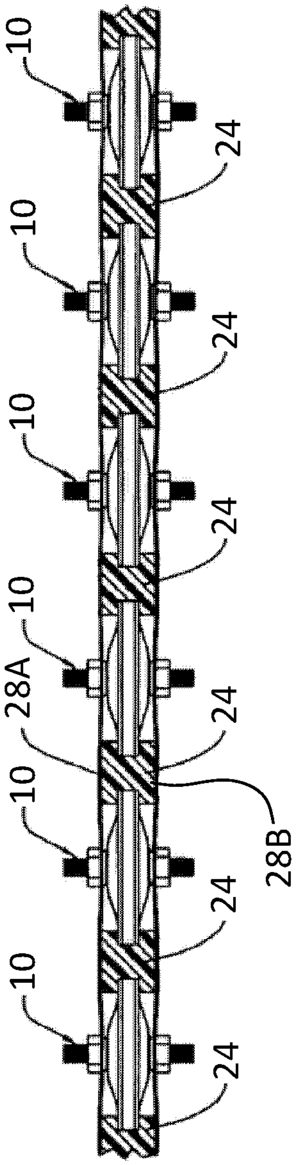
FIG. 3B PRIOR ART
FIG. 3B illustrates sectional view of the acoustic projector array of FIG. 3A.
Figure 4A:
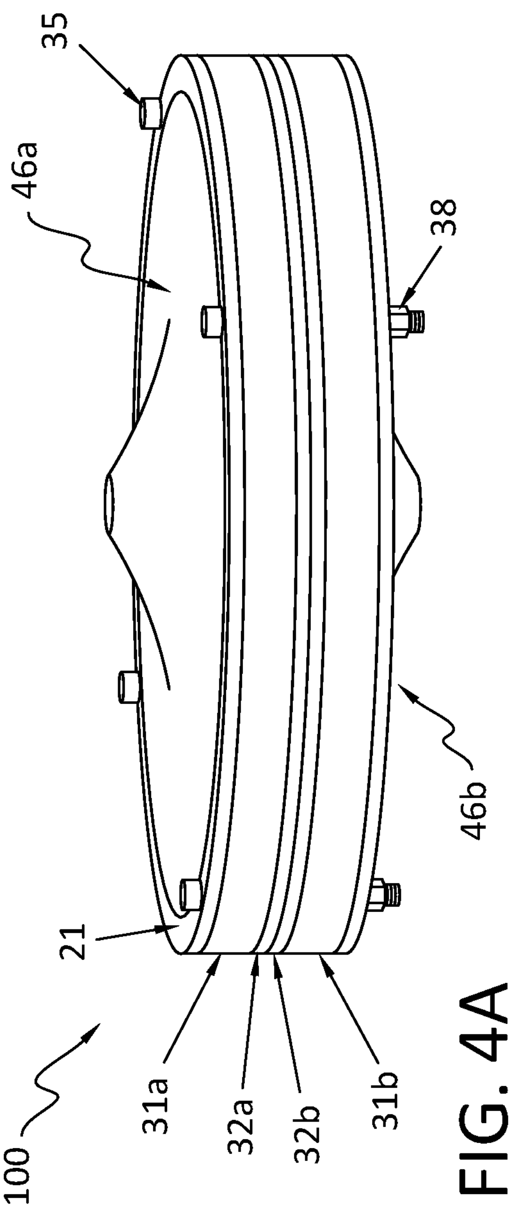
FIG. 4A shows a perspective view of a flextensional transducer in accordance with an embodiment of the invention.
Figure 4B:
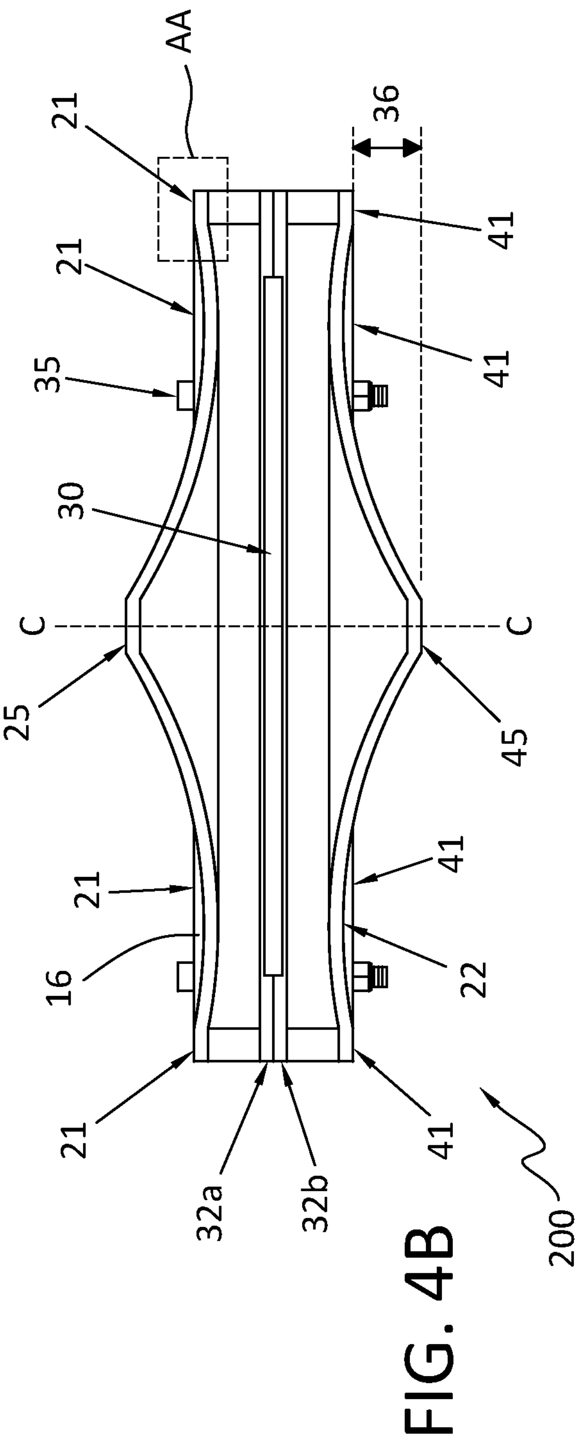
FIG. 4B illustrates a sectional view of the flextensional transducer of FIG. 4A.
Figures 5A, 5B:
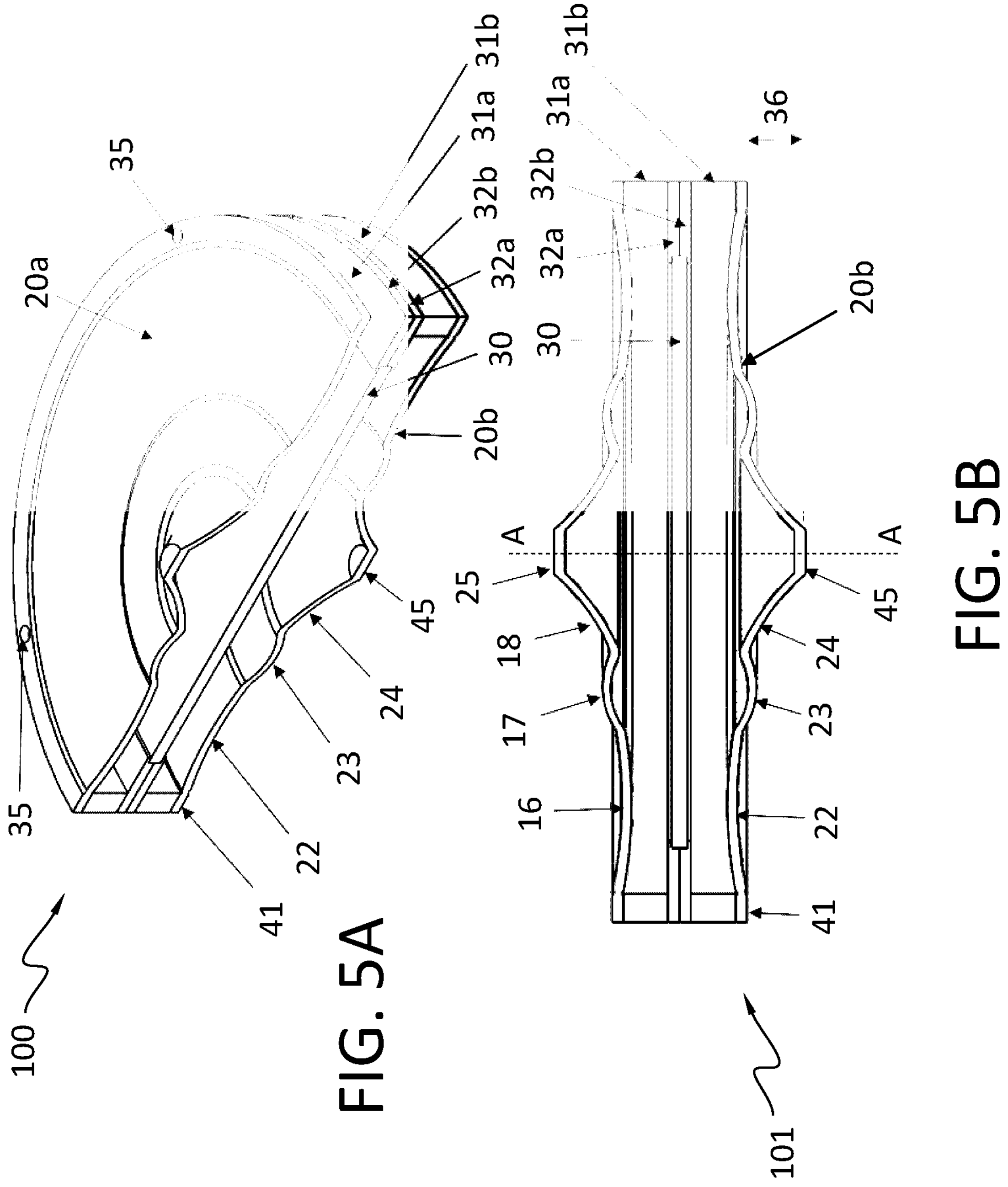
FIG. 5A depicts a cut-away view of a flextensional transducer in accordance with an embodiment of the invention.
FIG. 5B shows a sectional view of the flextensional transducer of FIG. 5A.

Examples of Class-VIII transducer platen undulation geometry include the jinc function, sometimes called a besinc function, shown in FIGS. 4A and 4B, or a recurve function illustrated in FIGS. 5A and 5B. A counterexample to an undulation function is a sinc function for, unlike a sinc function, the zeroes of a jinc function are not periodically spaced, which is critical to this new class of transducers. The platen geometry of the embodiment of the invention depicted in FIGS. 4A and 4B is the stationary shape of the fourth mode of a clamped circular membrane that is then horizontally flattened over a small region around its center and at its circumference. Other examples of undulation platen geometry can include the sombrero function and other such non-uniform zero-crossing wave functions having a positive semi-wave angle.

Turning to the drawings, FIG. 4A and FIG. 4B depict a Class-VIII transducer 200 in accordance with an embodiment of the invention. Transducer 200 includes identical top and bottom radial or elliptic isomorphic platens 46*a* and 46*b* that are of overall strictly increasing undulation but are locally strictly decreasing at the rims. Platens 46*a* and 46*b* display a jinc-type undulation geometry, i.e., a geometry that is described by a jinc function along the surface between any radial edge point and a maximum height center point. That is each platen undulates in a circular or elliptic pattern toward its apex (25 top 45 bottom) centered about a central axis illustrated as line C-C. In keeping with an aspect of the invention, the local radial maxima of the undulations strictly increase providing each platen with a strictly positive slope from an edge of generally flat outer rim 21 to generally flat apex region 25. The first inward undulations 16 (top) and 22 (bottom) have a local radial minima that is strictly below, or above, a generally flat outer rim 21 and 41 of platens 46*a* and 46*b* respectively. These flat outer rims 21 and 41 are separated by a top and bottom sidewalls 31*a* and 31*b* respectively that are configured in a manner as to capture a transverse circular or elliptic transductive element 30. Platens 46*a* and 46*b* have a generally flat apex region 25 and 45, respectively centered at central axis C-C. Sidewalls 31*a* and 31*b* capture thin notched outer rings 32*a* and 32*b* by a set of vertical thru-connectors 35 and a matching set of locking mechanisms 38. Notched rings 32*a* and 32*b*, fabricated of non-conductive material, in turn capture a transversal transductive element 30 as to create a rigid shell that intimately holds transductive element 30 in a transversal fashion across the middle of the shell.

In keeping with the invention, as illustrated in FIG. 5A and FIG. 5B respectively, such undulated platens 20*a* and 20*b* may have a variety of geometries provided that the platens are of strictly increasing undulation that are locally strictly decreasing at the rims leading to a positive vertical distance 36 between the generally flat rims 21 and 41 and the generally flat apex region 25 and 45 respectively centered at a central axis depicted as line A-A. Specifically, FIGS. 5A and 5B depict platens of having a semi-wave or undulation geometry of the recurve type. That is, a geometry described by a recurve function along a surface between any radial edge point and the maximum height center point of either top or bottom platen. The embodiment of FIG. 5A and FIG. 5B has multiple undulations 22-16-23-17-24-18 of strictly increasing local maxima 21-17-25.

Figure 6:
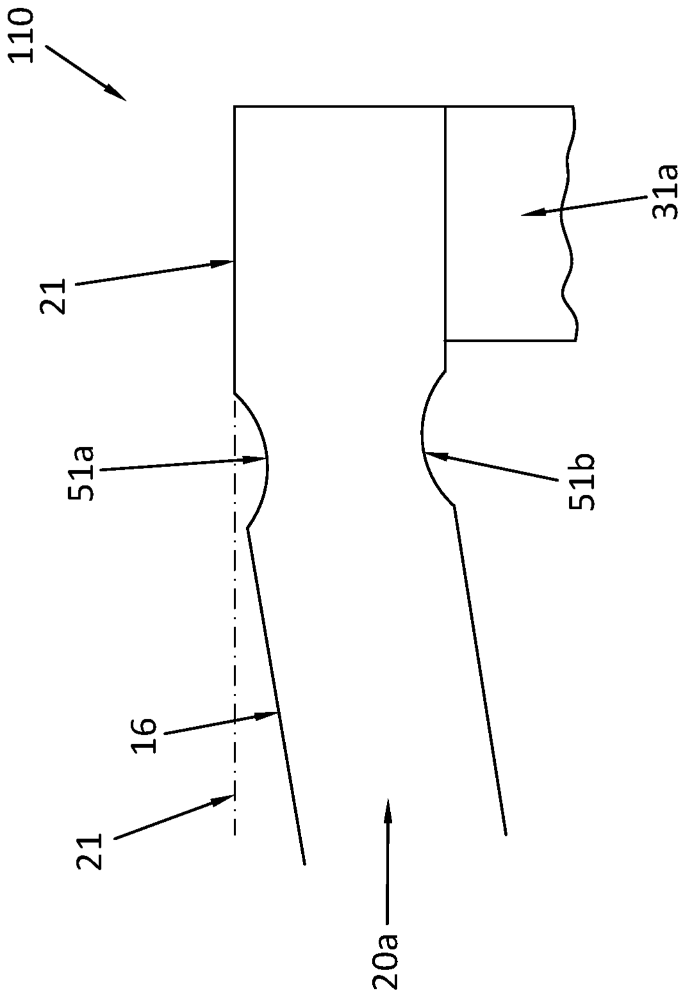
FIG. 6 depicts an exploded view of a platen taken from box AA of FIG. 4B.

FIG. 6 is an exploded view of the radial edge of platen 46*a* and rim 21. In this embodiment each top and bottom platens 46*a* and 46*b* may incorporate hinge points 51*a* and 51*b* obtained by uniformly excising platen material of the first inward undulation region 16 of top platen and first undulation region 22 of bottom platen in a radial or elliptic pattern located at the top and/or bottom surface of the platen at a region abutting the flat outer ring region 21 or the sidewall 31*a* respectively. In some embodiments, further hinge points (not shown) can similarly be established by uniformly excising platen material at locations across said platens 46*a* and 46*b* in a similar radial or elliptic fashion.

Figure 7:
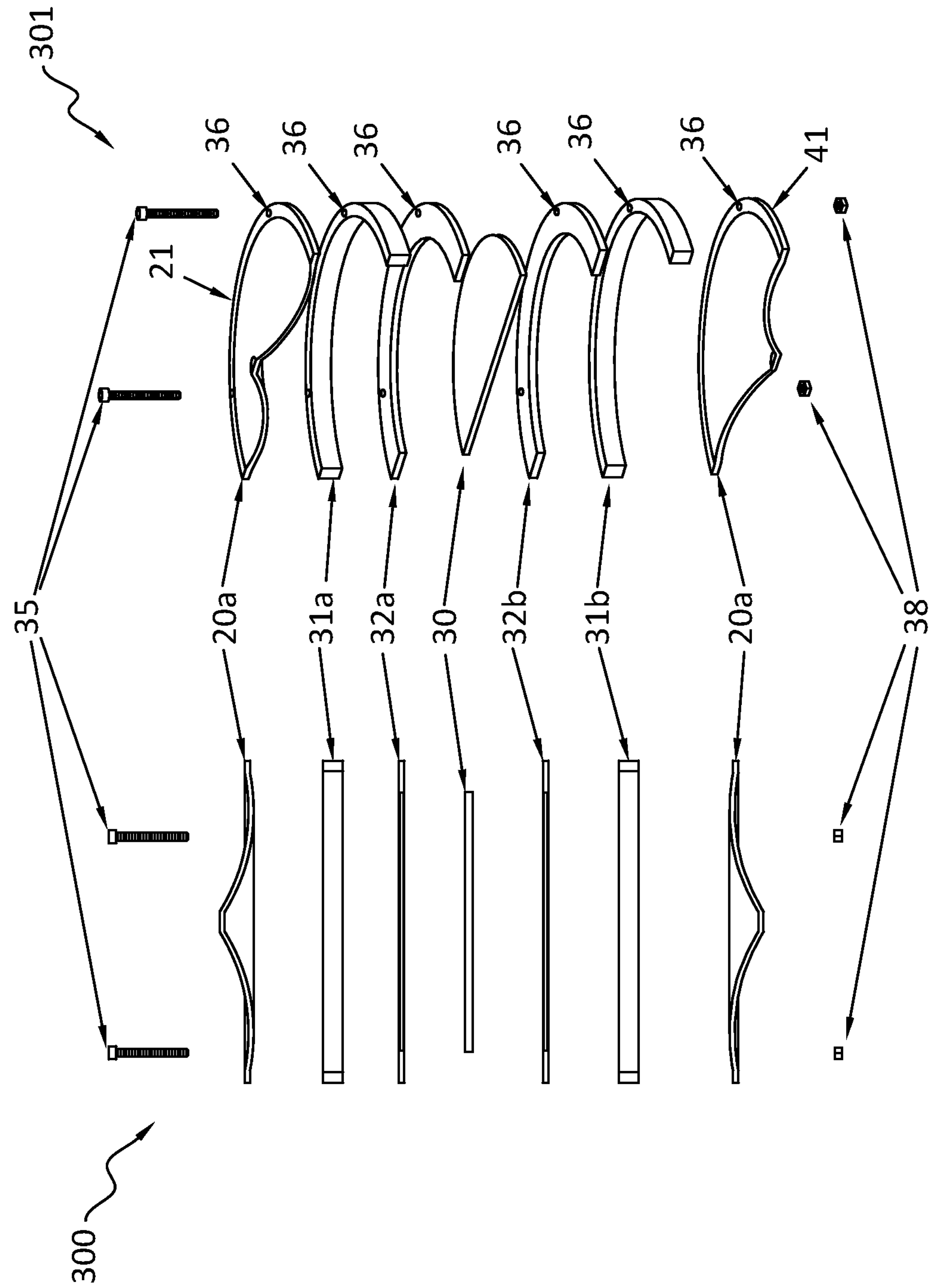
FIG. 7 shows an exploded view of a flextensional transducer in accordance with an embodiment of the invention.

In accordance with yet another embodiment, FIG. 7 shows a modular assembly of a Class-VIII transducer. This modular construction embodiment includes top and bottom increasing undulation platens 20*a* and 20*b* as described that have a set of holes 36 located around a generally flat rim region 21 that are aligned with corresponding holes 36 in stacked interstitial separating elements of that successively comprise of outer sidewall 31*a*, notched non-conductive planar ring 32*a*, transduction element 30, notched non-conductive planar ring 32*b*, outer sidewall 31*b*, and terminating with bottom strictly increasing undulation platens 20*b* at generally flat region 41. The notched regions of thin planar rings 32*a* and 32*b* are configured to intimately capture transductive element 30 when pressed together. A corresponding set of thru-connectors 35 traverse holes 36 of each element of 300 in the order described as to terminate underneath flat region 41 of 20*b*. In some embodiments, thru-connectors 35 may be standard threaded thru-bolts. A washer nut assembly 38 is then employed at each thru-connector 35 and torque is applied to tighten each said assembly 38 as to rigidly and intimately capture all said elements of transducer 300. In some embodiments adhesives agents may be applied between each successive element of transducer 300 that may also be part of an additional potting process for transducer 300.

Figure 8A:
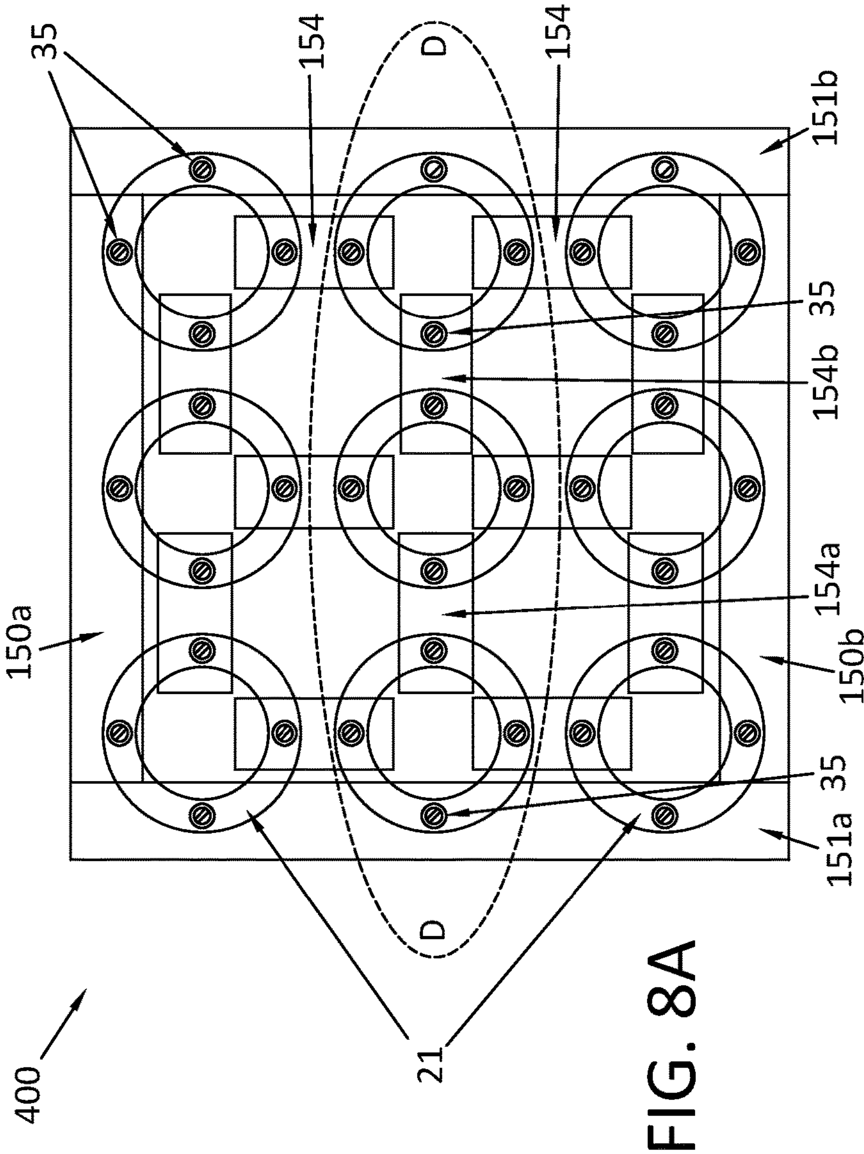
FIG. 8A illustrates a top view of a transducer array in accordance with an embodiment of the invention.
Figure 8B:
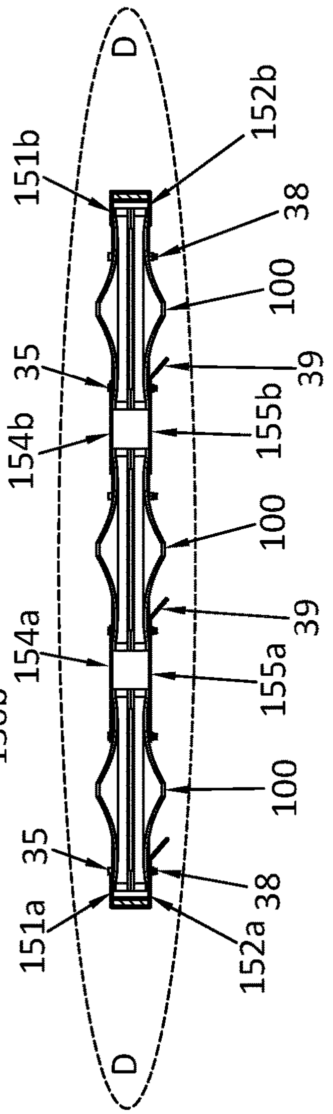
FIG. 8B is a sectional view of the transducer array taken along line DD of FIG. 8A.

The modular construction of Class-VIII transducers is highly conducive to enabling a similarly non-bonded modular constructed transducer array. FIGS. 8A and 8B depict an embodiment of such an array. As shown, in some embodiments, thru-connectors 35 can be arranged in a quadratic arrangement aligned vertically and horizontally. With such an arrangement stiff top and bottom beams 150*a* and 150*b* may have thru holes that align with the upper and lower thru-connectors 35 respectively. Similarly, stiff left and right beams 151*a* and 151*b* may have thru holes that align with the leftmost and rightmost thru-connectors 35, respectively. Further vertical stiff cross-connector beams 154 with matching aligned thru-holes 35 and horizontal stiff cross-connector beams 154*a* with matching aligned thru-holes 35 vertically and horizontally connect adjacent modular Class-VIII transducers, respectively. An identical arrangement is applied to the underside of the transducer array 400 wherein similarly, stiff left and right beams 152*a* and 152*b* may have thru holes that align with the leftmost and rightmost thru-connectors 35, respectively. Vertical stiff cross-connector beams 155*a* with matching aligned thru-holes 35 and horizontal stiff cross-connector beams 155*b* with matching aligned thru-holes 35 vertically and horizontally connect adjacent modular Class-VIII transducers, respectively. A thru-connector 35 is inserted through each set of aligned thru-holes in the array. A washer nut assembly 38 is then employed at each thru-bolt 35 and torque is applied to tighten each nut assembly 38 as to rigidly and intimately secure all of the transducers of array 400.

In some embodiments, thru-connectors may be eliminated by laser bonding the assembly. In such embodiments the assembly is placed under load during the laser bonding process which facilitates capture the transversal transductive assembly by the upper and lower undulation platens.

Still other embodiments may incorporate small slots or holes into the undulation platen as ports to introduce fluidic filler, such as an oil, as a means of introducing passive hydrostatic pressure compensation. Such fluidic compensation will further broaden the range of operational hydrostatic pressures without significant decrease in performance or failure.

Figure 9A:
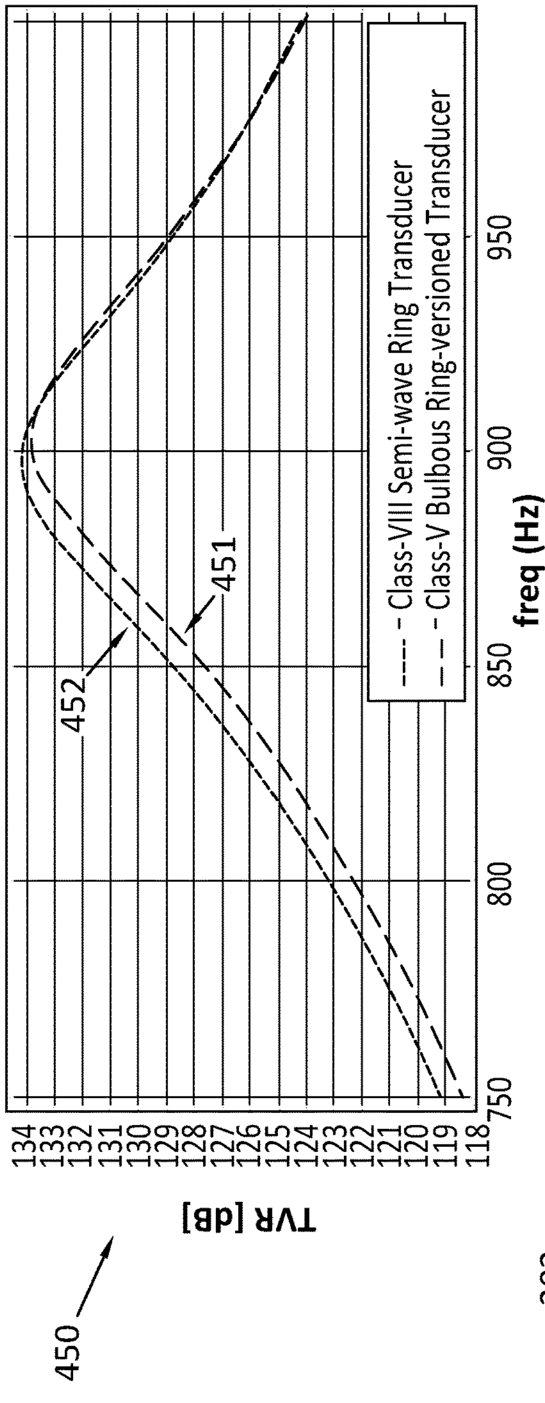
FIG. 9A is a is a plot showing a performance comparison of a semi-wave modular Class-VIII transducer of the present invention and a bulbous ring-versioned Class-V transducer.
Figure 9B:
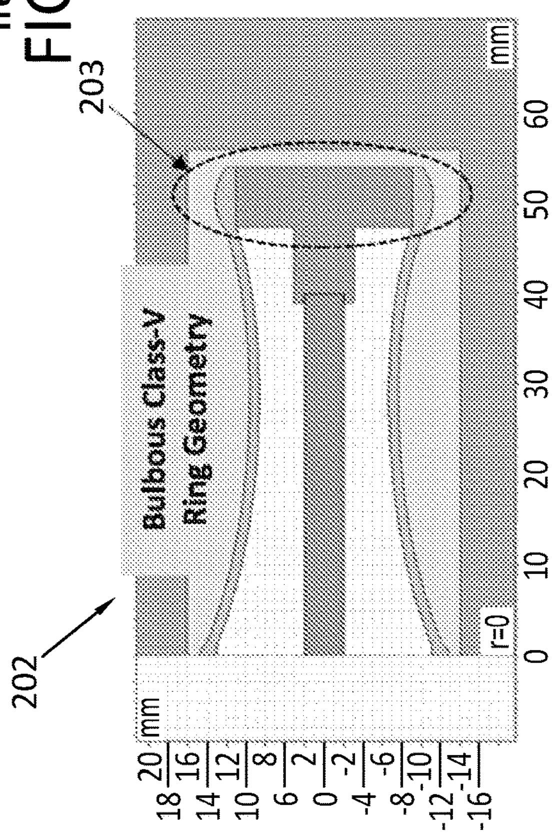
FIG. 9B is a sectional view of bulbous ring-versioned Class-V transducer.
Figure 9C:
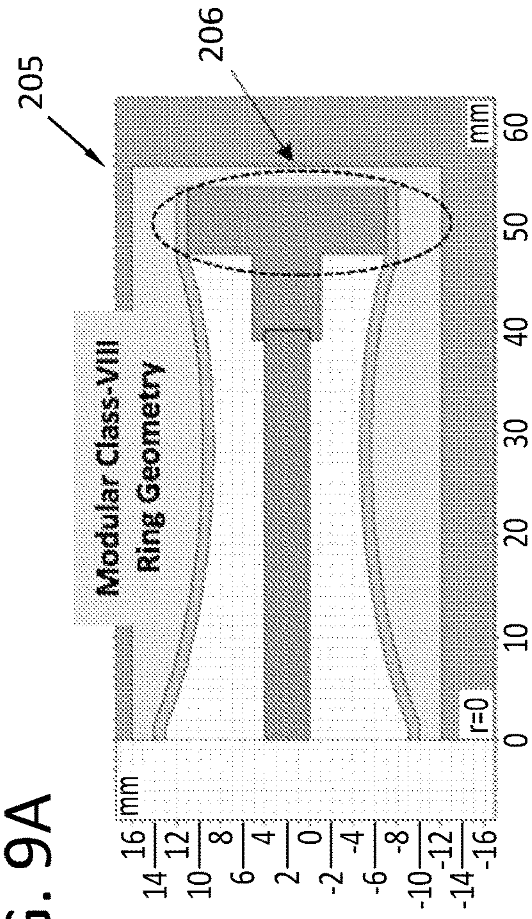
FIG. 9C is a sectional view of a Class-VIII transducer in accordance with an embodiment of the invention.

FIG. 9A is a plot showing a performance comparison of a semi-wave modular Class-VIII transducer 205 (FIG. 9C) of the present invention and a bulbous ring-versioned Class-V transducer 202 (FIG. 9B) that was obtained by rotating the Class IV transducer planar design described in U.S. Pat. No. 6,643,222 B2 circumferentially around its central axis as to produce a bulbous radial transducer 202. This results in the ring-versioned bulbous Class V transducer 202 having an annular bulbous sidewall 203 in contrast to the flat sidewall 206 of transducer 205. Plot 450 shows a comparison of transmitting voltage response (TVR) 452 for the transducer 205 and TVR 451 of the radial versioned planar bulbous design 202. Despite having considerably less weight, the TVR response 452 of transducer 205 is superior to that of Class V transducer 202. An additional advantage is that pressure models show that Class-VIII transducer 205 is far less limited in depth of operation (ambient pressure) than bulbous radial transducer 202.

Figure 10:
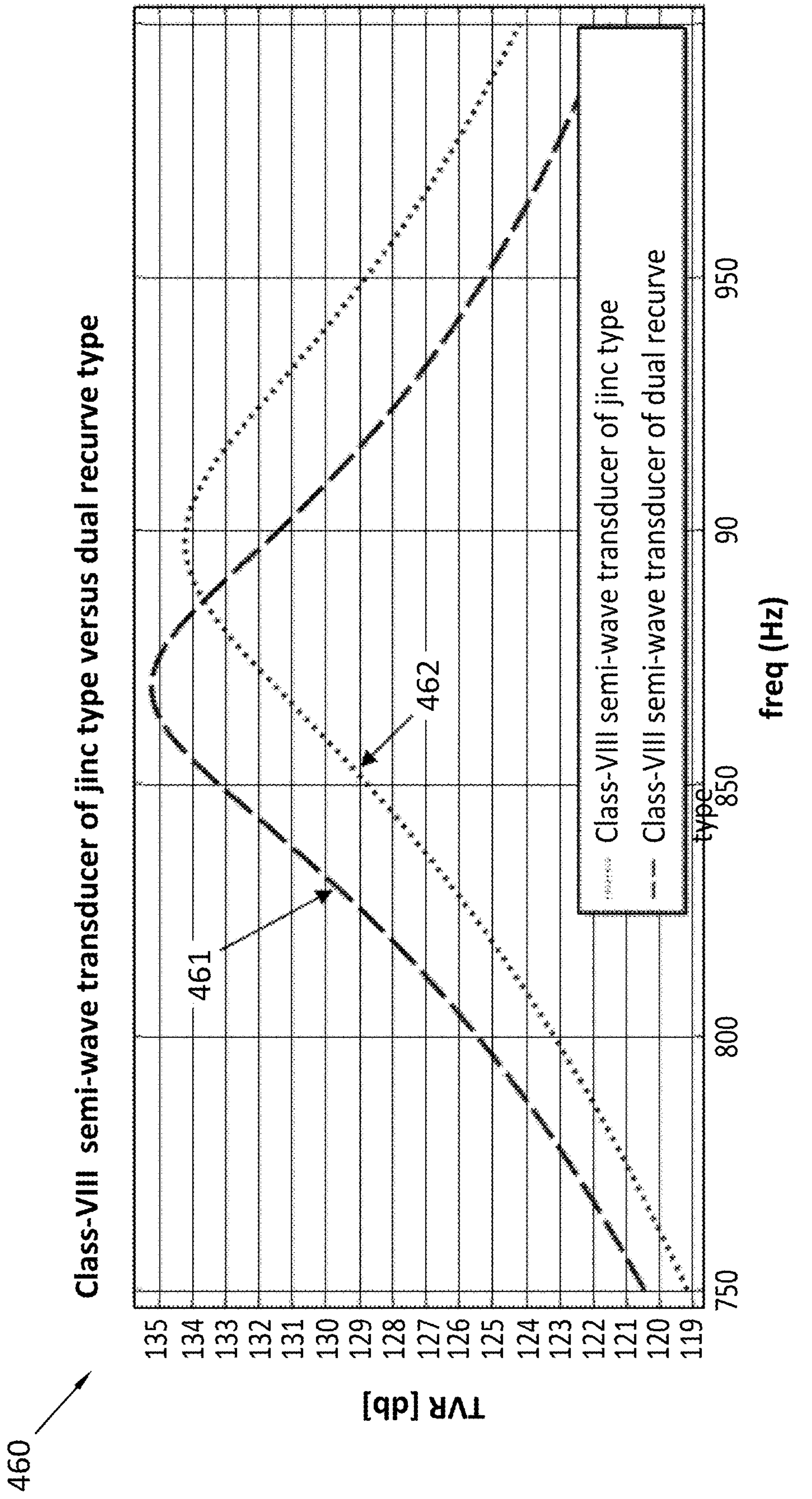
FIG. 10 is a plot showing the TVR versus frequency performance of the transducers of FIGS. 4A and 4B and of FIGS. 5A and 5B.

Referring to 460 of FIG. 10, shows the TVR versus frequency behavior comparison of a semi-wave transducers of this invention of jinc-type (see FIG. 4) and recurve type (see FIG. 5). That is, the transducers used to generate plot 460 are of equal sizing having the same planar diameter, same apex height 36, same sized sidewall configuration 31*a*, 32*a*, 32*b*, 31*b* and same transductive element 30 that, in this embodiment, is a piezoceramic disc. However, the transducers possess different platen undulation semi-wave geometries, one being jinc-type and one being recurve-type. The resulting TVR responses illustrate how differing undulation platen geometries lead to quite distinct TVR behavior in otherwise identical Class VIII transducers. In the embodiments shown, the TVR responses 461 and 462 show that a dual recurve Class VIII transducer will exhibit superior TVR response and operates over a lower frequency band than a jinc-function Class VIII transducer. However, the jinc-type transducer can operate to greater ambient pressures than the matching dual recurve-type. Plot 460 illustrates the trade between depth of operation TVR response and effective frequency band for differing type Class VIII transducer designs.

Figure 11A:
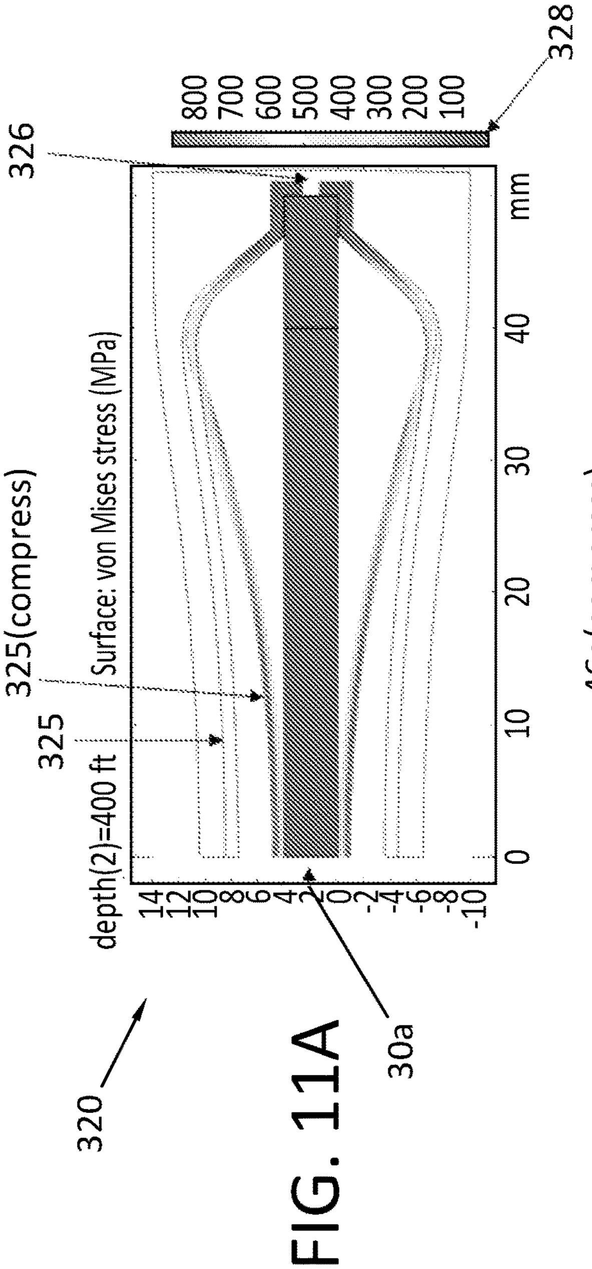
FIG. 11A shows platen deformations of Class-V cymbal transducers when applying hydrostatic pressures.
Figure 11B:
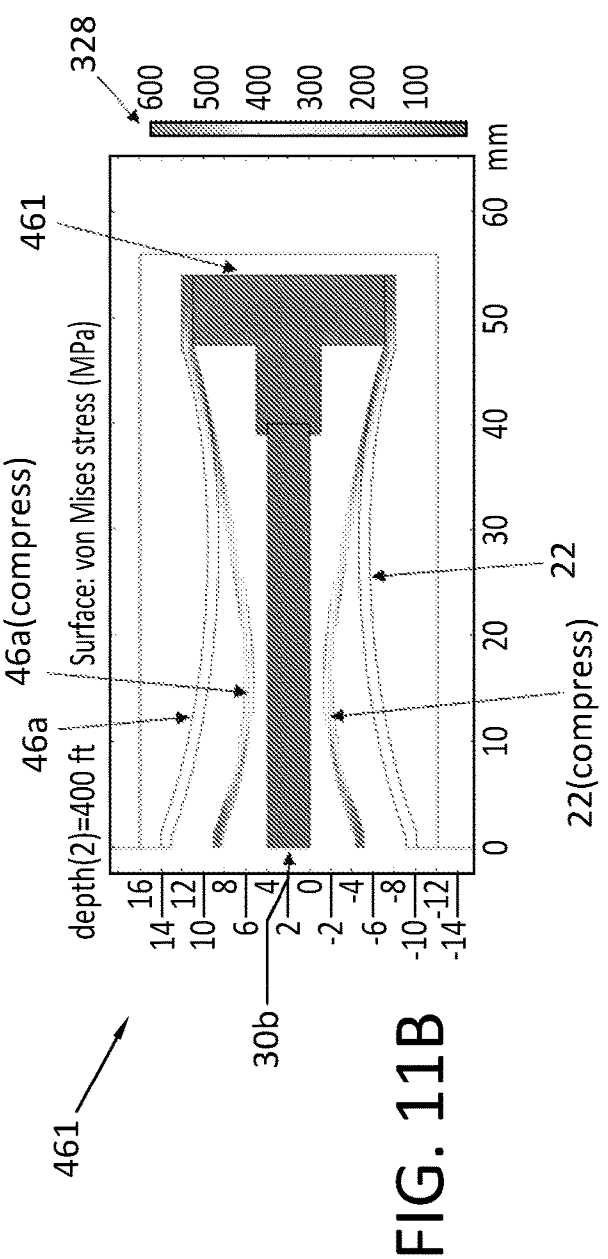
FIG. 11B depicts platen deformations of Class-VIII jinc transducers when applying hydrostatic pressures.

FIGS. 11A and 11B show platen deformations of Class-V cymbal and Class-VIII jinc transducers, respectively, when applying higher hydrostatic pressures. An identical sized Class-V cymbal transducer 320 and Class-VIII jinc-type transducer 461 have different sidewall arrangement. Cymbal transducer 320 employs the more standard sidewall 326 that captures disc piezoceramic 30*a*. Jinc-type transducer 461 employs a modular sidewall 462 to capture disc piezoceramic 30*b*. In this embodiment, disc piezoceramics 30*a* and 30*b* are of identical size and are made of the same material. As illustrated in FIG. 11A, as ambient pressure increases the platen 325 quickly collapses so as to impinge on the ceramic 30*a* thereby disabling piezoceramic 30*a* from functioning as a transducer. In contrast, as ambient pressure similarly increases on the Class-VIII jinc-type transducer 461 the platen 462 compresses at its first inward undulation 46*a* causing it to compress without impinging on the ceramic 30*b*. Platen 462 continues to not impinge on piezoceramic 30*b* until far greater pressure is applied than is needed to compress 325 onto the piezoceramic 30*a*. The result is that same sized Class-VIII radial transducers 461 can operate effectively to far greater depth than Class-V radial transducers, such as cymbal transducers, without providing significant additional mass into their platen designs.

It is believed that there are two underlying reasons to why the transducers of this invention exhibit high hydrostatic pressure stability. The first is that the undulation geometry of the platens mimic a more spheroidal implementation of the shell or housing of the disc transductive assembly, the second is that the undulation geometry is so designed as to impart a negative mechanical Poisson's ratio on the housing. The first better approximates the optimal design of a transducer housing for operating to greater depths without incurring the large overall sizing penalty, the second assures that the transductive assembly remains in compression as hydrostatic pressures increase. Correctly designed, these geometries also increase acoustic power projection capability per unit volume without resorting to heavy mass additions.

While the present invention has been illustrated by the description of specific embodiments thereof, and while the embodiments have been described in considerable detail, it is not intended to restrict or in any way limit the scope of the appended claims to such detail. The various features discussed herein may be used alone or in any combination. Additional advantages and modifications will readily appear to those skilled in the art. The invention in its broader aspects is therefore not limited to the specific details, representative apparatus and methods and illustrative examples shown and described. Accordingly, departures may be made from embodiments and examples herein described without departing from the scope or spirit of the general inventive concept.

The present invention may be employed in various systems and devices that require energy harvesters, actuators and/or sensors to operate in extreme conditions such as hypersonic vehicles, hypersonic weapons, re-entry vehicles, communication satellites, jet engines, industrial processes, space propulsion systems and other deep space devices. Further, the invention may be used in a variety of high temperature, high radiation sensor implementations including strain sensors, pressure sensors, gas sensors and accelerometers.

What is claimed is:

1. A circular flextensional transducer comprising: first and second platens of semi-wave geometry, each platen having a positive semi-wave angle; and a transductive element secured between the rims of said first and second platens and that is coaxially aligned with said first and second platens, wherein each said first and second platens includes a hinge point, wherein said first and second platens each have a flat annular rim separated by top and bottom sidewalls, said hinge points abutting the top and bottom sidewalls.

2. The circular flextensional transducer of claim 1 wherein the semi-wave geometry includes a pattern defined by a jinc function.

3. The circular flextensional transducer of claim 1 wherein the semi-wave geometry includes a pattern defined by a recurve function.

* * * * *